(12) United States Patent
Burke et al.

(10) Patent No.: US 6,570,731 B2
(45) Date of Patent: May 27, 2003

(54) SYSTEM FOR DETECTING AN EDGE OF A MOVING DATA STORAGE MEDIUM

(75) Inventors: Michael Burke, Lafayette, CO (US); James Zweighaft, Boulder, CO (US); Steve Bounds, Loveland, CO (US)

(73) Assignee: Quantum Corporation, Milpitas, CA (US)

(*) Notice: Subject to any disclaimer, the term of this patent is extended or adjusted under 35 U.S.C. 154(b) by 208 days.

(21) Appl. No.: 09/854,729

(22) Filed: May 14, 2001

(65) Prior Publication Data
US 2002/0167746 A1 Nov. 14, 2002

(51) Int. Cl.$^7$ .............................................. G11B 21/02
(52) U.S. Cl. ..................... 360/75; 360/77.12; 360/78.02
(58) Field of Search ........................... 360/77.12, 78.02, 360/75, 31; 340/673, 675, 686.2; 324/210, 212, 226

(56) References Cited

U.S. PATENT DOCUMENTS 4,476,503 A   10/1984   Solhjell
5,111,347 A   5/1992    Ono et al.
5,457,585 A   10/1995   Christensen Primary Examiner—Alan T. Faber
(74) Attorney, Agent, or Firm—Patton Boggs LLP

(57) ABSTRACT

The system for detecting the edge of a moving data storage medium measures the ambient noise level of the magneto-resistive read head when the magneto-resistive read head is completely off the magnetic tape media. The system for detecting the edge of a moving data storage medium sets a signal threshold that is a predetermined increase over the magneto-resistive read head output signal generated by the ambient noise. The system for detecting the edge of a moving data storage medium then moves the magneto-resistive read head on to the magnetic tape media, where an increase in the magneto-resistive read head output signal is generated due to the friction of the moving magnetic tape coming into contact with the magneto-resistive read head, causing an increased noise level. The resultant increase in the magneto-resistive read head output signal, when it exceeds the signal threshold, is indicative of the presence of the edge of the magnetic tape and can be used as an accurate measure of the edge of the magnetic tape.

8 Claims, 3 Drawing Sheets

SYSTEM FOR DETECTING AN EDGE OF A MOVING DATA STORAGE MEDIUM

FIELD OF THE INVENTION

This invention relates to tape drive system for reading and writing data on a data storage medium and a system for detecting the physical edge of the data storage medium as it moves under the read/write heads in the data storage subsystem.

PROBLEM

It is a problem in the field of tape drive system to detect the physical edge of the data storage medium as it is in motion. This is especially problematic in the field of removable data storage media, such as magnetic tape cartridges that contain magnetic tape media, where the data is recorded on the data storage medium in a horizontal direction along the length of the data storage medium. This format is typically termed "linear recording" and comprises a series of closely spaced tracks written in parallel across the width of the data storage medium. In order to maximize the data storage capacity of the data storage medium, the tracks are made as narrow as possible and positioned closely together. It is therefore necessary to accurately position the tracks on the data storage medium to avoid crowding of the tracks, to avoid wasting the data storage space provided by the width of the data storage medium, and the accurately select tracks to read data previously written on these tracks. It is therefore necessary to find an accurate reference point on the data storage medium as a starting point for the first track that is recorded. The edge of the data storage medium is typically used by tape drive system for this reference point.

Individual data tracks are very narrow and a large number of tracks can therefore be written on the data storage medium on a given width of magnetic tape. In a magnetic tape data storage medium, magneto-resistive read/thin film write heads are used to read and record the data. A plurality of magneto-resistive read/thin film write heads and their associated electronics are typically grouped into a single physical read/write head apparatus so that a plurality of tracks can be concurrently written and read. This read/write head apparatus is mounted on a movable carriage mechanism that functions to position the magneto-resistive read/thin film write heads over a selected set of tracks on the magnetic tape. The alignment of the magneto-resistive read/thin film write heads with the tracks, especially tracks previously written on the magnetic tape, requires the use of precision read/write head positioning apparatus and the location of a predefined reference point on the magnetic tape to ensure that the proper set of tracks are being read/written.

There are numerous existing magnetic tape head positioning systems for effecting the alignment of the magneto-resistive read heads with the tracks written on the magnetic tape. These magnetic tape head positioning systems either write alignment tracks on the magnetic tape as a reference point or dynamically determine the edge of the magnetic tape as the reference point.

U.S. Pat. No. 4,476,503 teaches a method of magnetic tape edge detection where a write head is positioned in-line with the magneto-resistive read head. The edge of the magnetic tape is determined in a single pass operation where both the write head and the magneto-resistive read head are moved in synchronization until they are below the edge of the magnetic tape. The write head is turned on and the motion of the magnetic tape is started. Since the magneto-resistive read head is below the edge of the magnetic tape, initially no signal is detected and only an ambient noise signal is produced by the magneto-resistive read head. Once the magnetic tape is in motion, the write head is turned on and a signal of predetermined characteristics is applied to the write head to produce magnetic flux transitions on the magnetic tape. Both the write head and the magneto-resistive read head are slowly moved together to a position on the magnetic tape. As the two sets of heads cross the edge of the magnetic tape, magnetic flux transitions are produced on the magnetic tape by the write head, which is located upstream of the magneto-resistive read head. These magnetic flux transitions are detected by the magneto-resistive read head as the magnetic tape passes under the magneto-resistive read head and compared to a reference signal indicative of the expected magnetic flux transitions. The detected magnetic flux transitions detected by the magneto-resistive read head are thereby used to define the edge of the magnetic tape.

U.S. Pat. No. 5,111,347 teaches a method of detecting the physical edge of the magnetic tape in a two-step process. In a first step, the write head is positioned to the approximate physical edge of the magnetic tape, as determined by the magnetic tape guide apparatus, and a data signal is written on the magnetic tape. The width of the write head is greater than the uncertainty in the location of the edge of the magnetic tape as determined by the magnetic tape guide apparatus, so the data signal is written partially on the magnetic tape and partially off the edge of the magnetic tape. In the second step, the magnetic tape is rewound and restarted so the previously written data signal can be detected by the read head, which is positioned at the edge of the magnetic tape. The read head is moved vertically past the edge of the magnetic tape and the signal strength of the previously written data signal is measured to determine the edge of the magnetic tape. The increase in the signal strength as the read head is moved on to the magnetic tape is used to identify the magnetic tape edge.

U.S. Pat. No. 5,457,585 teaches a simplified method of edge detection that detects the edge of the magnetic tape in a single pass and does not require the use of the write head. The magneto-resistive read heads output a noise signal, which increases as the read heads rubs on the magnetic tape, which output signal is termed "thermal noise" due to the nature of its generation. The noise level of a magneto-resistive read head traveling across blank magnetic tape is not the same as the noise level of a magneto-resistive read head that is not in contact with the magnetic tape. This difference in noise signal output by the magneto-resistive read head can be used to identify the edge of the magnetic tape. This is accomplished by first positioning the magneto-resistive read head below the magnetic tape and measuring the "off magnetic tape" ambient noise level. The magnetic tape is placed in motion and the magneto-resistive read head is moved slowly upward, with the noise output being measured at each position of the magneto-resistive read head as it is stepwise moved on to the magnetic tape. This measured noise level is stored in memory for later use. The magneto-resistive read head is finally positioned so that it is located above the edge of the magnetic tape, completely on the magnetic tape, where an "on magnetic tape" noise level is measured. The edge of the magnetic tape is then determined by calculating the difference between the off magnetic tape noise level and the on magnetic tape noise level as evidenced by the plurality of measurements stored in memory.

A problem with these existing magnetic tape head positioning systems that use an edge detection process is that they either require the use of the write head and the magneto-resistive read head operating in synchronization, or require the collection of a significant amount of data for processing to calculate the edge of the magnetic tape. In both of these cases, the magneto-resistive read/thin film write head must be repositioned after the edge determination is made, since the magneto-resistive read/thin film write head is positioned entirely on the magnetic tape before the edge detection is completed. The time delay occasioned by these calculations causes a significant amount of magnetic tape to be used for the edge detection process.

SOLUTION

The above-described problems are solved and a technical advance achieved by the present system for detecting the edge of a moving data storage medium which provides a simplified magnetic tape edge detection process using only the ambient noise level of the magneto-resistive read head as the baseline.

This system for detecting the edge of a moving data storage medium measures the ambient noise level of the magneto-resistive read head when the magneto-resistive read head is completely off the magnetic tape media. The ambient noise is caused by thermal and resistive noise in the magneto-resistive read head itself and its associated read path electronics. The ambient noise results in an output signal from the magneto-resistive read head, which is indicative of the ambient noise level. The system for detecting the edge of a moving data storage medium sets a signal threshold that is a predetermined increase over the magneto-resistive read head output signal generated by the ambient noise. The system for detecting the edge of a moving data storage medium then moves the magneto-resistive read head on to the magnetic tape media, where an increase in the magneto-resistive read head output signal is generated due to the friction of the moving magnetic tape coming into contact with the magneto-resistive read head, causing an increased noise level. As soon as the resultant increase in the magneto-resistive read head output signal exceeds the signal threshold, it is indicative of the presence of the edge of the magnetic tape and can be immediately used as an accurate measure of the edge of the magnetic tape. Thus, the present system for detecting the edge of a moving data storage medium can immediately determine the edge of the magnetic tape, using a simple threshold.

DETAILED DESCRIPTION OF THE DRAWINGS

Digital data is stored on magnetic tape by tape drive systems that use a variety of designs, but in all cases, magnetic tape media is wound between a pair of magnetic tape reels as data is transferred to or from the magnetic tape medium. In the art of data storage, the physical space required to store data is an important concern. To conserve space, magnetic tape drives often use a single reel magnetic tape cartridge design. The single reel design utilizes a supply reel located within the magnetic tape cartridge and a take-up reel located within the tape drive system. After the magnetic tape cartridge is inserted into the tape drive system, the magnetic tape media is connected to the take-up reel and wound along a magnetic tape path internal to the tape drive system.

One example of a magnetic tape path is a guide roller tape path located between the supply reel and the take-up reel. The guide roller tape path uses a plurality of guide rollers to guide the magnetic tape media as it is wound between the supply reel and the take-up reel. Guide roller tape paths have the advantage of reducing friction in the tape path to that of rolling friction caused by components such as ball bearings.

A magneto-resistive read/write head, or "read/write head" as it is commonly referred to in the art, located in the tape path, reads and writes digital data as the magnetic tape media passes over the read/write head. The digital data is written and read from the magnetic tape media in tracks running in a longitudinal direction relative to the magnetic tape media. To read or write data on a specific track, the magneto-resistive read/write head must align with that track as the magnetic tape media passes over the magneto-resistive read/write head. To prevent errors in reading and writing data, the tape path traveled by the magnetic tape media must be reproducible with a high degree of accuracy, with the term tracking being defined as the alignment of the magneto-resistive read/write head with an individual track on the magnetic tape media.

Improvements in the art of magneto-resistive read/write heads have increased the number of tracks that can be included on magnetic tape media. As a result, individual tracks are narrower and require higher tolerances of tape path reproducibility to maintain alignment of a desired track with the magneto-resistive read/write head. Alignment of a specific tape track with the magneto-resistive read/write head is especially critical during data writing because a misalignment can result in writing over data contained on adjacent tracks.

Figure 1:
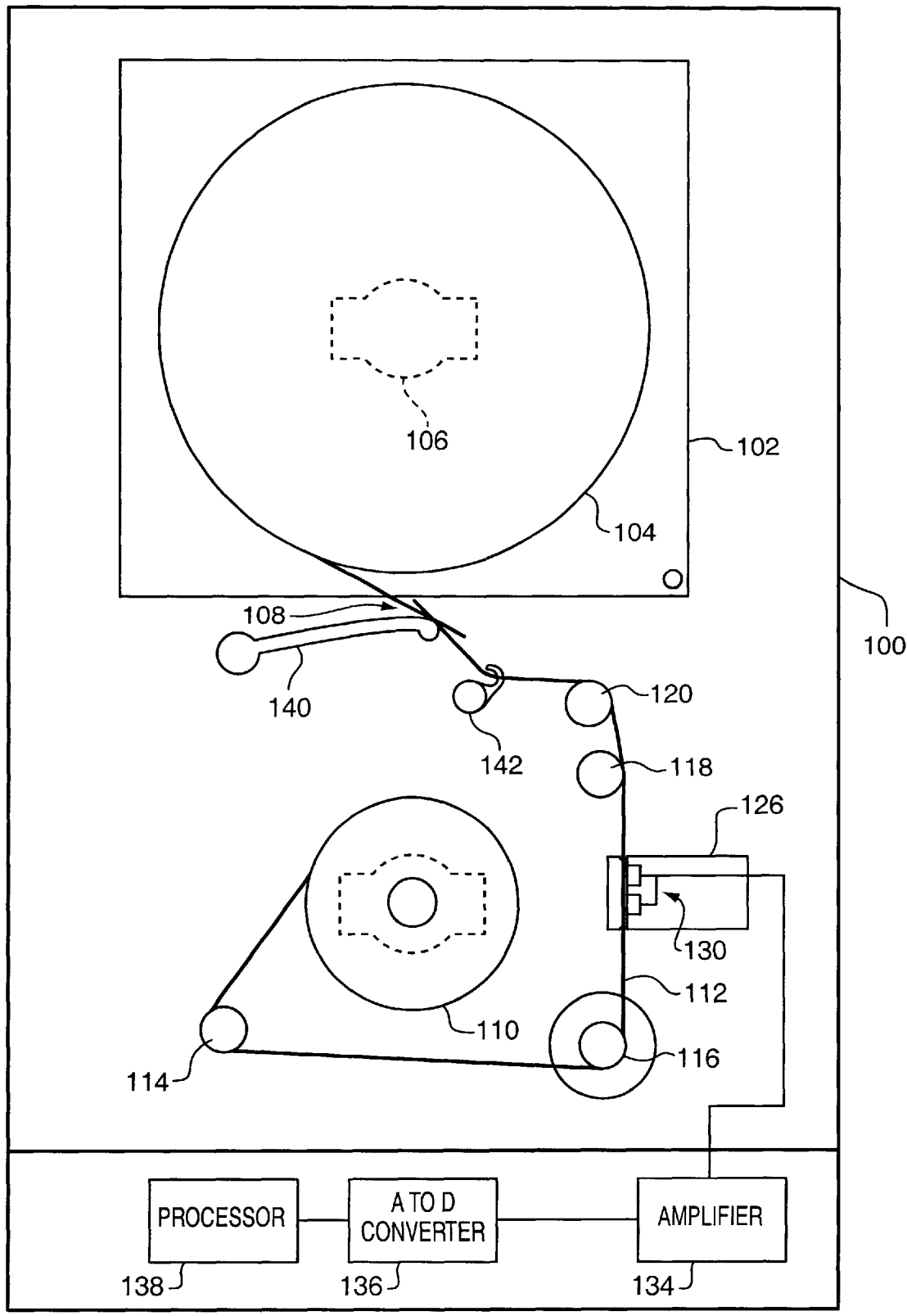
FIG. 1 illustrates, in block diagram form, the architecture of the present system for detecting the edge of a moving data storage medium and a tape drive in which it is operational.

FIG. 1 illustrates, in block diagram form, the architecture of the present system for detecting the edge of a moving data storage medium. This system is incorporated into a media transport, such as tape drive 100, that typically uses a roller guiding system. The magnetic tape media 112 is wound between supply reel 104 located in a magnetic tape cartridge 102 and take-up reel 110 located in the tape drive 100 through magnetic tape path. The magnetic tape path comprises guide rollers 114, 116, 118 and 120 and tape head 126. Tape drive 100 also includes other components commonly known in the tape drive art, such as catch 142 and positioning lever 140, used to connect magnetic tape media 112 with a leader 108 and wind the magnetic tape into magnetic tape drive 100. The tape head 126 reads and writes data from magnetic tape media 112 and includes a head positioning apparatus 132 for moving the tape head 130 in a direction perpendicular to the motion of the magnetic tape media 112, across a width of the magnetic tape media 112.

Figure 2:
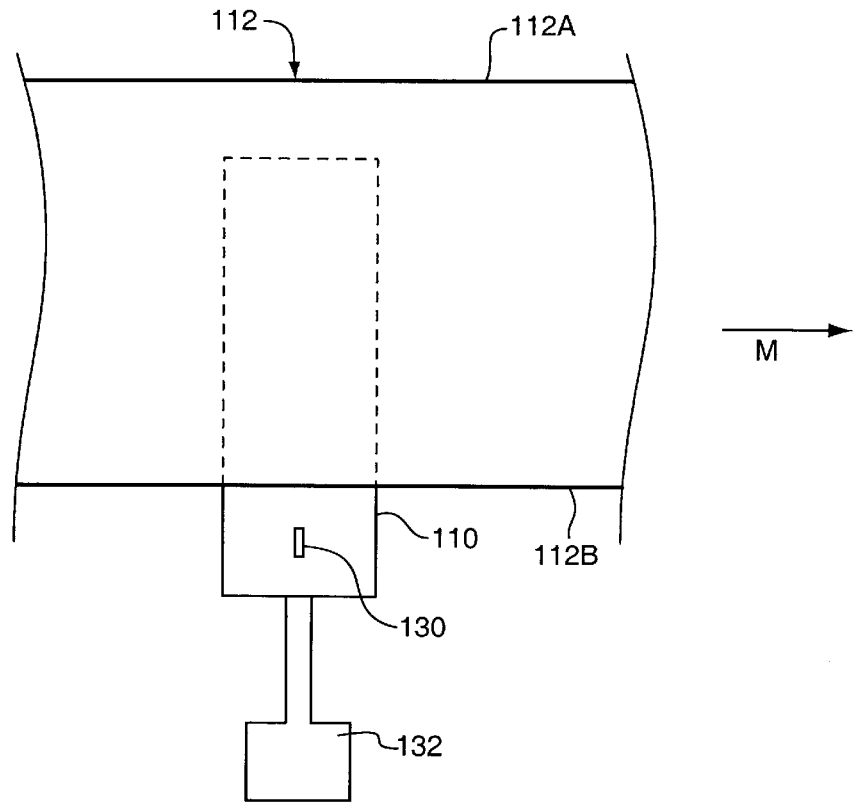
FIG. 2 illustrates the relative location of a typical magneto-resistive read head and a magnetic tape in an initial positioning of the magneto-resistive read head.

The magnetic tape media 112 has a top edge 112A and a bottom edge 112B. The tape head 126 includes a carrier assembly 110 that contains a magneto-resistive read head 130 and is shown in FIG. 2 positioned in partial contact with the magnetic tape 112, with the magneto-resistive read head 130 being located below one edge of the magnetic tape 112, such as bottom edge 112B. A head positioning mechanism 132 is attached to the carrier 110 and is used to position the carrier 110 at its lowest position, as shown in FIG. 2. The magneto-resistive read head 130 is not in contact with the magnetic tape media 112 and quickly reaches thermal equilibrium at the ambient temperature and outputs a low amplitude noise signal. The magneto-resistive read head 130 is connected to an amplifier 134 that increases the amplitude of the signal output by the magneto-resistive read head 130, and applies the amplified signal to the analog-to-digital converter 136. The analog-to-digital converter 136 outputs a digital representation of the detected signal to processor 138, which uses this signal in the edge determination process.

Figure 3:
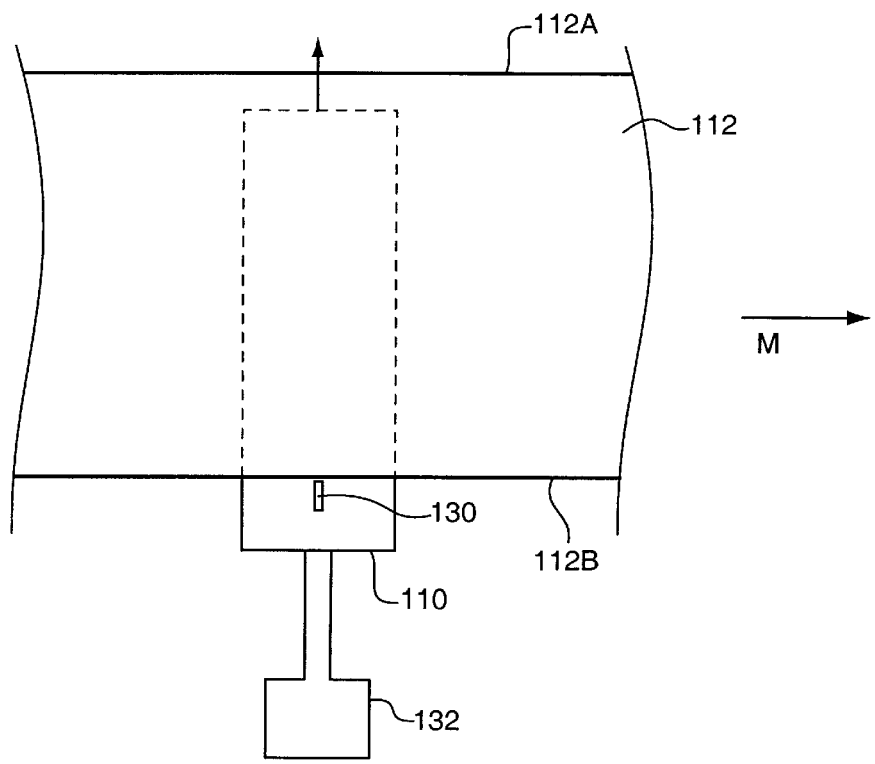
FIG. 3 illustrates the relative location of a typical magneto-resistive read head and a magnetic tape in a tape edge determination positioning of the magneto-resistive read head.
Figure 4:
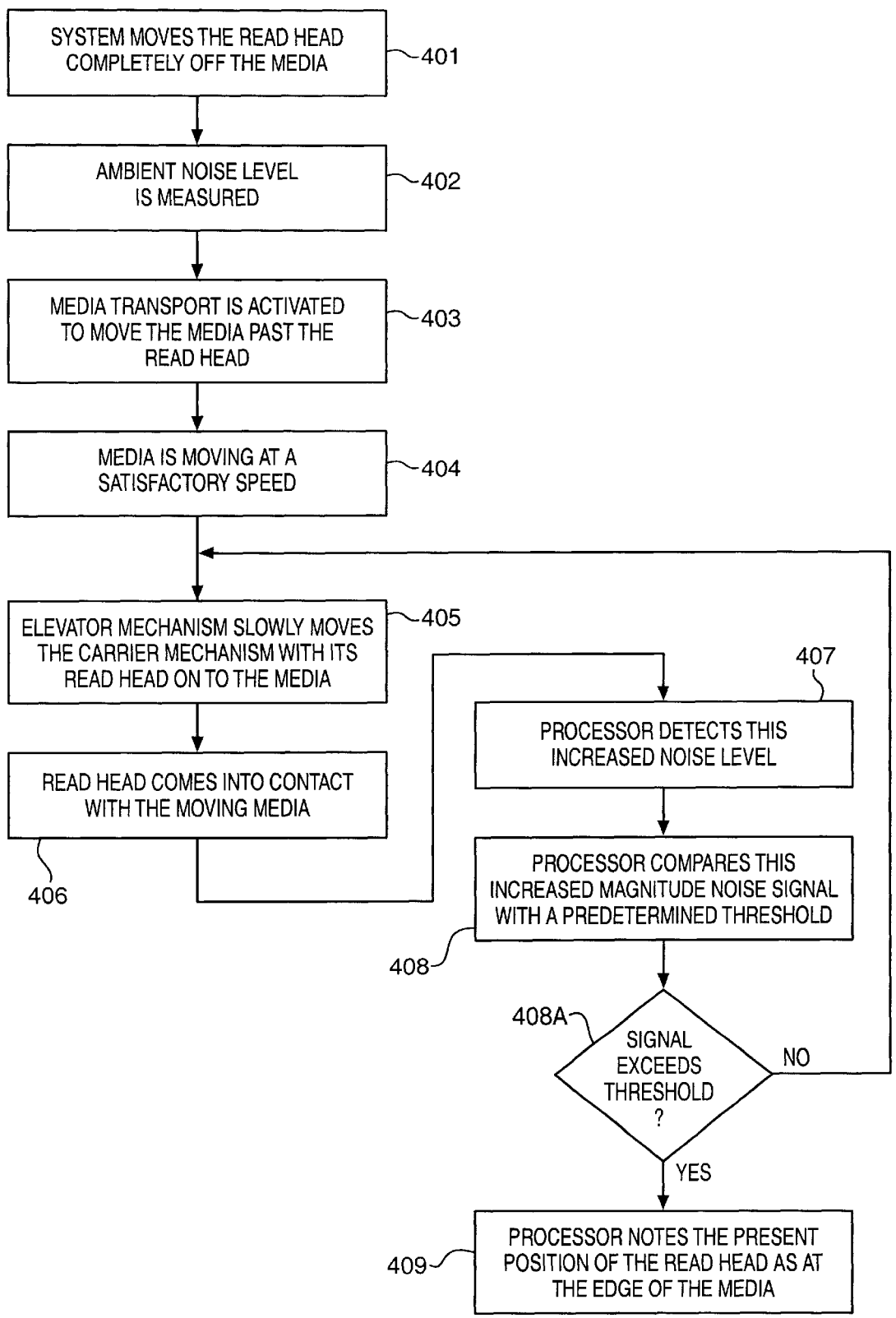
FIG. 4 illustrates in flow diagram form the operation of the present system for detecting the edge of a moving data storage medium.

FIG. 2 illustrates the relative location of a typical magneto-resistive read head and a magnetic tape in an initial positioning of the magneto-resistive read head, FIG. 3 illustrates the relative location of a typical magneto-resistive read head and a magnetic tape in a tape edge determination positioning of the magneto-resistive read head, and FIG. 4 illustrates in flow diagram form the operation of the present system for detecting the edge of a moving data storage medium.

The system for detecting the edge of a moving data storage medium measures the ambient noise level of the magneto-resistive read head 130 by moving the magneto-resistive read head 130 completely off the magnetic tape media 112 at step 401. The ambient noise is caused by thermal noise in the magneto-resistive read head 130 itself and its associated read path electronics 134. The ambient noise results in an output signal from the magneto-resistive read head 130, which is indicative of the ambient noise level. The off magnetic tape noise level produced by the magneto-resistive read head 130 varies from magnetic tape drive to magnetic tape drive as well as over time and with changes in the ambient conditions. Thus, the ambient noise level must be measured by the operation of the above-described read circuit at step 402. Once the ambient signal level is determined by processor 138, the magnetic tape transport is activated at step 403 and the magnetic tape media 112 is moved in a horizontal direction, as indicated by the arrow M on FIG. 3. When the magnetic tape media 112 is moving at a satisfactory speed at step 404, the elevator mechanism 132 at step 405 slowly moves the carrier mechanism 110 with its magneto-resistive read head 130 in a vertical direction on to the magnetic tape 112. The magneto-resistive read head 130 comes into contact with the moving magnetic tape 112 at step 406 and begins to heat up due to the friction between the moving magnetic tape 112 and the surface of the magneto-resistive read head 130. This temperature change causes an increase in the magnitude of the noise signal produced by the magneto-resistive read head 130, even if the magnetic tape media 112 is blank. The processor 138 at step 407 detects this increased noise signal by the operation of the circuit illustrated in FIG. 1 and compares this increased magnitude noise signal with a predetermined threshold at step 408. The threshold can be any method of determining a difference between a presently measured signal and a previously measured signal or previously determined signal level. For example, the processor 138 can set a threshold of x times the ambient noise level which represents the noise signal magnitude indicative of the magneto-resistive read head 130 being located over the magnetic tape media 112. The threshold of x is selected to be a value that differs from the ambient noise level by a small amount, so a minor yet determinable change in the noise signal indicates the edge of the magnetic tape media 112. Once this threshold is reached or exceeded, at step 409 the processor 138 notes the present position of the magneto-resistive read head 130 as at the edge of the magnetic tape media 112.

There is no need to determine the on magnetic tape noise level, since once the edge of the magnetic tape media 112 is determined, the magneto-resistive read head 130 can be positioned on the magnetic tape media 112 with respect to this position. Since the width of the magneto-resistive read head 130 is very small compared to the width of the magnetic tape media 112, the accuracy of the edge of magnetic tape determination is high and the magneto-resistive read head 130 can therefore be positioned over tracks previously written on the magnetic tape media 112 with a high degree of precision. This operation eliminates the need to write data on the magnetic tape media 112 to determine the edge of the magnetic tape media 112 or determine the on magnetic tape noise level as well as the off magnetic tape noise level before the edge of magnetic tape media 112 can be determined.

SUMMARY

The system for detecting the edge of a moving data storage medium measures the ambient noise level of the magneto-resistive read head when the magneto-resistive read head is completely off the magnetic tape media then moves the magneto-resistive read head on to the magnetic tape media, where an increase in the ambient noise is generated due to the friction of the moving magnetic tape coming into contact with the magneto-resistive read head. An increase in the noise level is indicative of the presence of the edge of the magnetic tape and can be used as an accurate measure of the edge of the magnetic tape.

What is claimed:

1. Apparatus for detecting an edge of a moving data storage medium, comprising:

media transport means for moving said data storage medium in a predetermined motion along a predetermined media path:

read head means for reading data from said date storage medium by generating a read signal;

read head positioning means for moving said read head means in a direction perpendicular to said data storage medium motion across a width of said data storage medium; and edge measurement means, responsive to movement of said read head means from a position off said data storage medium to a position partially on said data storage medium, for determining said data storage medium edge as a function of a predetermined change in magnitude of said read signal, said edge measurement means comprising:

means for measuring an ambient noise generated by said read head means as said read signal when said read head means is off said data storage medium; and means for calculating a noise threshold based on said ambient noise.

2. The edge detection apparatus of claim 1 wherein said edge measurement means further comprises:

means for measuring said read signal as said read head means is moved on to said data storage medium;

means for comparing said noise threshold with said measured read signal; and means, responsive to said measured read signal being of magnitude at least as great as said noise threshold, for identifying a present location of said read head means as said edge of said data storage medium.

3. The edge detection apparatus of claim 1 wherein said edge measurement means further comprises:

means, responsive to measurement of said ambient noise, for activating said media transport means to move said data storage medium in a predetermined motion along a predetermined media path;

means, responsive to said data storage medium moving at a predetermined speed, for measuring said read signal as said read head means is moved on to said data storage medium.

4. The edge detection apparatus of claim 3 wherein said edge measurement means further comprises:

means for comparing said noise threshold with said measured read signal; and means, responsive to said measured read signal being of magnitude at least as great as said noise threshold, for identifying a present location of said read head means as said edge of said data storage medium.

5. A method of detecting an edge of a moving data storage medium, comprising the steps of:

moving said data storage medium, by operation of a media transport, in a predetermined motion along a predetermined media path:

reading data from said data storage medium by generating a read signal with a read head;

moving said read head in a direction perpendicular to said data storage medium motion across a width of said data storage medium: and determining, in response to movement of said read head from a position off said data storage medium to a position partially on said data storage medium, said data storage medium edge as a function of a predetermined change in magnitude of said read signal, said step of determining comprising:

measuring an ambient noise generated by said read head means as said read signal when said read head is off said data storage medium; and calculating a noise threshold based on said ambient noise.

6. The method of detecting an edge of a moving data storage medium of claim 5 wherein said step of determining further comprises:

measuring said read signal as said read head is moved on to said data storage medium;

comparing said noise threshold with said measured read signal; and identifying, in response to said measured read signal being of magnitude at least as great as said noise threshold, a present location of said read head as said edge of said data storage medium.

7. The method of detecting an edge of a moving data storage medium of claim 5 wherein said step of determining further comprises:

activating, in response to measurement of said ambient noise, said media transport to move said data storage medium in a predetermined motion along a predetermined media path;

measuring, in response to said data storage medium moving at a predetermined speed, said read signal as said read head is moved on to said data storage medium.

8. The method of detecting an edge of a moving data storage medium of claim 7 wherein said step of determining further comprises:

comparing said noise threshold with said measured read signal; and identifying, in response to said measured read signal being of magnitude at least as great as said noise threshold, a present location of said read head as said edge of said data storage medium.

\* \* \* \* \*